(12) United States Patent
Zhang et al.

(10) Patent No.: US 11,276,252 B2
(45) Date of Patent: Mar. 15, 2022

(54) TEXTURE ACQUISITION DEVICE AND METHOD FOR MANUFACTURING THE SAME, TEXTURE ACQUISITION METHOD

(71) Applicant: BOE TECHNOLOGY GROUP CO., LTD., Beijing (CN)

(72) Inventors: Lin Zhang, Beijing (CN); Lei Wang, Beijing (CN); Haisheng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/903,289

(22) Filed: Jun. 16, 2020

(65) Prior Publication Data

US 2021/0182525 A1 Jun. 17, 2021

(30) Foreign Application Priority Data

Dec. 17, 2019 (CN) .......................... 201911300935.0

(51) Int. Cl.
*G06K 9/00* (2006.01)
*G06V 40/13* (2022.01)
(Continued)

(52) U.S. Cl.
CPC ........ *G06V 40/1318* (2022.01); *G02F 1/1368* (2013.01); *G02F 1/133603* (2013.01); *G02F 1/133606* (2013.01); *G02F 1/136209* (2013.01)

(58) Field of Classification Search
CPC .............. G06K 9/0004; G06K 9/00013; G02F 1/133603; G02F 1/136209; G02F 1/1368;
(Continued)

(56) References Cited

U.S. PATENT DOCUMENTS 10,713,999 B2  7/2020 Sun
10,990,794 B2  4/2021 Hai et al.
(Continued)

FOREIGN PATENT DOCUMENTS

CN  107967467 A  4/2018
CN  108153053 A  6/2018
CN  109598248 A  4/2019

OTHER PUBLICATIONS

Office Action issued in corresponding Chinese Patent Application No. 20191130935.0, dated Dec. 3, 2021.

*Primary Examiner* — Abdul-Samad A Adediran
(74) *Attorney, Agent, or Firm* — McDermott Will & Emery LLP

(57) ABSTRACT

Embodiments of the present disclosure provide a texture acquisition device, a method for manufacturing a texture acquisition device, and a texture acquisition method. The texture acquisition device includes: a display panel; a backlight layer including a plurality of light sources spaced apart from each other, the light sources being configured to emit light toward a light exit side of the display panel; and a plurality of photoelectric sensors, wherein the texture acquisition device is configured in such a way that the light emitted by the light source is irradiated to a region between adjacent light sources after being reflected by an object to be detected on the display panel, to form an optical path, and at least one photoelectric sensor is provided in the optical path so as to detect the light reflected by the object to be detected to recognize an texture image of the object to be detected.

8 Claims, 5 Drawing Sheets

(51) Int. Cl.
*G02F 1/13357* (2006.01)
*G02F 1/1362* (2006.01)
*G02F 1/1368* (2006.01)

(58) Field of Classification Search
CPC .......... G02F 1/133606; G02F 1/13338; G06V 40/1318
See application file for complete search history.

(56) References Cited

U.S. PATENT DOCUMENTS

| | | |
|---|---|---|
| 2017/0161543 A1* | 6/2017 | Smith .................. G06K 9/0004 |
| 2018/0033835 A1* | 2/2018 | Zeng .................. G06K 9/00013 |
| 2019/0080141 A1* | 3/2019 | Tan .................. G02F 1/133606 |
| 2019/0213948 A1 | 7/2019 | Sun |
| 2020/0184179 A1 | 6/2020 | Hai et al. |
| 2020/0201117 A1* | 6/2020 | Zheng ................ G02F 1/13338 |

* cited by examiner

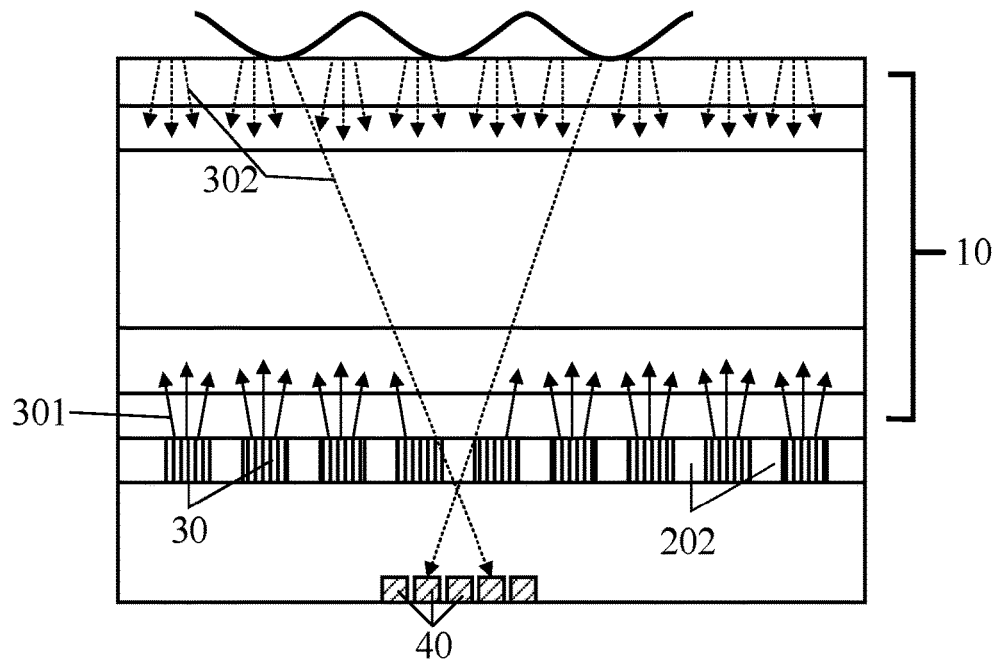

FIG. 6 forming a backlight layer on a side of the display panel away from a light exit side of the display panel, the backlight layer including an array of light sources, the light sources being configured to irradiate an object to be detected on the light exit side of the display panel, a gap being between adjacent light sources — S71 forming an array of photoelectric sensors to detect the light reflected by the object to be detected — S72

FIG. 7

TEXTURE ACQUISITION DEVICE AND METHOD FOR MANUFACTURING THE SAME, TEXTURE ACQUISITION METHOD

CROSS-REFERENCE TO RELATED APPLICATION

This application claims priority of Chinese Patent Application No. 201911300935.0 filed on Dec. 17, 2019 in China National Intellectual Property Administration, the disclosure of which is incorporated herein by reference in entirety.

TECHNICAL FIELD

Embodiments of the present disclosure relate to the field of display technology or texture recognition technology, and in particular, to a texture acquisition device, a method for manufacturing a texture acquisition device, and a texture acquisition method.

BACKGROUND

The liquid crystal display is typically constructed in such a way that a liquid crystal cell is placed between two parallel glass substrates, thin film transistors (TFTs) are provided on the lower glass substrate, and a color filter is provided on the upper glass substrate. The rotation direction of liquid crystal molecules is controlled by the signal on the TFT and the voltage change, so as to control whether each pixel point emits polarized light or not to achieve the display purpose. LCD display technology has the characteristics of mature technology, strong cost controllability, long working time, uniform light emission and the like, but the LCD screen itself cannot emit light, and therefore it must rely on an external light source to illuminate the liquid crystal molecules to achieve the effect of light emission. Acquisition and recognition of texture such as fingerprint, or palm print cannot be achieved in an in-screen way based on a LCD display panel in the prior art.

SUMMARY

According to an embodiment of the present disclosure, there is provided a texture acquisition device, comprising:
a display panel;
a backlight layer comprising a plurality of light sources spaced apart from each other, the light sources being configured to emit light toward a light exit side of the display panel; and
a plurality of photoelectric sensors,
wherein the texture acquisition device is configured in such a way that the light emitted by the light source is irradiated to a region between adjacent light sources after being reflected by an object to be detected on the display panel, to form an optical path, and at least one photoelectric sensor is provided in the optical path so as to detect the light reflected by the object to be detected to recognize an texture image of the object to be detected.

According to some embodiments of the present disclosure, the display panel is a liquid crystal display panel.

According to some embodiments of the present disclosure, the plurality of light sources spaced apart from each other constitute a light source array, and the plurality of photoelectric sensors constitute a photoelectric sensor array.

According to some embodiments of the present disclosure, the photoelectric sensors, other than ones located at outermost periphery, are disposed between adjacent light sources.

According to some embodiments of the present disclosure, the backlight layer comprises a substrate, and the photoelectric sensors and the light sources are disposed on or in the substrate.

According to some embodiments of the present disclosure, the region between the adjacent light sources is provided with a through hole, and the photoelectric sensor array is disposed on a side of the backlight layer away from the display panel, so that the light reflected by the object to be detected passes through the through hole to reach a group of the photoelectric sensors.

According to some embodiments of the present disclosure, the backlight layer comprises a substrate, the light sources are disposed on or in the substrate, and the region between the adjacent light sources on the substrate is provided with a through hole.

According to some embodiments of the present disclosure, the light sources are mini light emitting diodes or micro light emitting diodes.

According to some embodiments of the present disclosure, a distance between any two adjacent photoelectric sensors is constant, a distance between any two adjacent light sources is constant, and a number ratio of the photoelectric sensors to the light sources is 1:1.

According to some embodiments of the present disclosure, the display panel comprises, in order from the light exit side of the display panel to the backlight layer:
a first polarizer;
a color filter substrate;
a liquid crystal layer;
an array substrate; and
a second polarizer.

According to some embodiments of the present disclosure, a TFT circuit is provided on the array substrate for controlling deflection of the liquid crystal layer, and a black matrix is provided on a side of the TFT circuit facing the backlight layer for absorbing light irradiated to the TFT circuit.

According to an embodiment of the present disclosure, there is further provided a method for manufacturing a texture acquisition device, comprising:
forming a backlight layer on a side of a display panel away from a light exit side of the display panel, the backlight layer comprising a plurality of light sources spaced apart from each other, the light sources being configured to emit light toward the light exit side of the display panel; and
forming a plurality of photoelectric sensors,
wherein the texture acquisition device is configured in such a way that the light emitted by the light source is irradiated to a region between adjacent light sources after being reflected by an object to be detected on the display panel, to form an optical path, and at least one photoelectric sensor is provided in the optical path so as to detect the light reflected by the object to be detected to recognize an texture image of the object to be detected.

According to some embodiments of the present disclosure, the forming a plurality of photoelectric sensors comprises forming the photoelectric sensors between adjacent light sources.

According to some embodiments of the present disclosure, the forming the backlight layer comprises forming a through hole in a region between adjacent light sources, and the forming a plurality of photoelectric sensors comprises forming a photoelectric sensor array on a side of the backlight layer away from the display panel, so that the light reflected by the object to be detected passes through the through hole to reach a group of the photoelectric sensors.

According to some embodiments of the present disclosure, the light sources and/or the photoelectric sensors are formed by using a transfer technique.

According to some embodiments of the present disclosure, the method comprises:

forming a substrate on the side of the display panel away from the light exit side of the display panel;

providing the light sources on the substrate, the light sources being spaced apart from each other; and providing the photoelectric sensors between the adjacent light sources on the substrate.

According to an embodiment of the present disclosure, there is further provided a texture acquisition method of the texture acquisition device according to any one of the above embodiments, comprising:

turning on the plurality of light sources in a time-sharing manner;

in response to turning-on of each light source, detecting the light reflected by the object to be detected by various photoelectric sensors to recognize the texture image of the object to be detected; and integrating texture images recognized by the various photoelectric sensors for turning-on of each light source.

According to an embodiment of the present disclosure, there is further provided a texture acquisition method of the texture acquisition device according to any one of the above embodiments, comprising:

turning on the plurality of light sources simultaneously;

in response to turning-on of the light sources, receiving light passing through through holes by various photoelectric sensors and forming reduced images of a texture; and combining the reduced images formed by the various photoelectric sensors.

BRIEF DESCRIPTION OF THE DRAWINGS

FIG. 6 is a schematic structural view of a texture acquisition device according to an embodiment of the present disclosure;

FIG. 7 is a flowchart of a method for manufacturing a texture acquisition device according to an embodiment of the present disclosure;

DETAILED DESCRIPTION OF EMBODIMENTS

Figure 1:
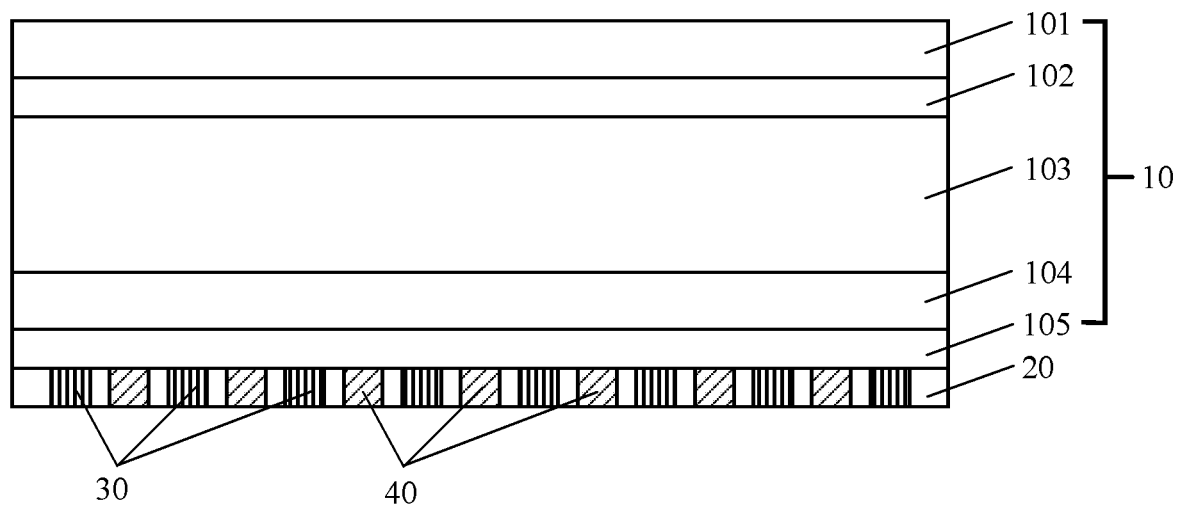
FIG. 1 shows a structural relationship of a texture acquisition device according to an embodiment of the present disclosure.

Various solutions and features of the present disclosure will be described below with reference to the drawings.

It should be understood that various modifications may be made to the embodiments of the present disclosure. Therefore, the above description should not be construed as limiting the present disclosure, but should merely be construed as examples of the embodiments. Other modifications may be envisaged by those skilled in the art within the scope and spirit of the present disclosure.

The drawings included in the specification and forming a part of the specification illustrate the embodiments of the present disclosure, and are used to explain the principle of the present disclosure together with the general description of the present disclosure proposed above and the detailed description of the embodiments proposed below.

These and other features of the present disclosure will become apparent from the following description of the embodiments given as non-limiting examples in alternative forms with reference to the drawings.

It should also be understood that, although the present disclosure has been described with reference to some specific examples, many other equivalent forms of the present disclosure may be implemented by those skilled in the art, they have the features of the claims and therefore fall within the scope defined thereby.

The above and other aspects, features, and advantages of the present disclosure will become more apparent in view of the following detailed description in combination with the drawings.

Hereinafter, specific embodiments of the present disclosure will be described with reference to the drawings; however, it should be understood that the embodiments are merely examples of the present disclosure, which can be implemented in various ways. Well-known and/or repetitive functions and structures will not be described in detail to avoid unnecessary or redundant details that may obscure the present disclosure. Therefore, the specific structural and functional details herein are not intended to limit the present disclosure, but merely serve as a basis for claims and a representative basis for teaching those skilled in the art to use the present disclosure in a variety of any practically suitable detailed structures.

This specification may use the phrases "in an embodiment", "in another embodiment", "in yet another embodiment" or "in other embodiments", they may refer to one or more of the same or different embodiments according to the present disclosure.

As mentioned above, acquisition and recognition of texture such as fingerprint, or palm print cannot be achieved in an in-screen way based on a LCD display panel in the prior art. In addition, the existing schemes for in-screen texture acquisition based on various display panels have higher costs. The technologies used in the technical transformation of in-screen texture acquisition for different display panels are different, and the cost of technical input is relatively high.

The purpose of the embodiments of the present disclosure is to provide a texture acquisition device, a method for manufacturing a texture acquisition device, and a texture acquisition method, to solve the problem that acquisition and recognition of texture such as fingerprint, or palm print cannot be achieved in an in-screen way based on a LCD display panel in the prior art and the problem that the in-screen texture acquisition for various display panels have higher process costs.

In order to solve the above technical problems, the embodiments of the present disclosure provide a texture acquisition device, which is mainly used to integrate and be compatible with various known display technologies including LCD display technology, so as to realize the acquisition and recognition functions of the texture such as fingerprint, or palm print in an in-screen way for the display panels, especially the LCD display panels.

FIG. 1 shows a structural relationship of a texture acquisition device. The texture acquisition device mainly includes a display panel 10, an array of light sources 30 and an array of photoelectric sensors 40 disposed on a backlight layer 20. The light exit side of the display panel 10 (the upper side of the display panel 10 in FIG. 1) is configured for receiving an object to be detected, the display panel 10 should be at least configured to be transparent or light-transmissive, to ensure that the light emitted by the array of light sources 30 may be illuminated to the object to be detected. The backlight layer 20 is disposed on a side of the display panel away from the light exit side of the display panel 10 (the lower side of the display panel 10 in FIG. 1), the backlight layer is mainly used to receive the array of light sources 30. The light source 30 (denoted by blocks with vertical-line shadow in FIG. 1) is used to irradiate light to the object to be detected placed at the light exit side of the display panel 10. There is a gap between adjacent light sources 30, so that the light can be irradiated to the gap after being reflected by the object to be detected, and be received by one or more photoelectric sensors 40 (denoted by blocks with oblique-line shadow in FIG. 1) at the gap. The photoelectric sensors 40 at different gaps form an array of photoelectric sensors 40, and the light reflected by the object to be detected is acquired as a basis for recognizing the texture image of the object to be detected. Here, one arrangement manner of the array of photoelectric sensors 40 is shown as an example, but does not limit the present disclosure, and other arrangement manners will be given below. Specifically, other arrangement manners may be adopted, as long as one or more of the photoelectric sensors are correspondingly arranged on optical paths in which the light is reflected by the object to be detected and irradiated to various gaps, thereby the photoelectric sensors detect the light reflected by the object to be detected, i.e., recognizing the texture image of the object to be detected.

In this embodiment, by providing an array of light sources 30 that illuminate the object to be detected and an array of photoelectric sensors 40 that acquire light, the light reflected by the object to be detected can be acquired as a basis for recognizing the texture image of the object to be detected after a convenient and low-cost modification that is compatible with various display panels including a liquid crystal display panel is implemented, thereby realizing in-screen acquisition and recognition of the texture such as fingerprint, or palm print.

In some embodiments, mini light emitting diodes (mini LEDs) or micro light emitting diodes (micro LED) may be used as the light sources 30 to reduce the overall thickness of the texture acquisition device. It should be noted that the positional relationship between the array of light sources 30 and the array of photoelectric sensors 40 shown in FIG. 1 is only an exemplary arrangement relationship, and in actual application, the positional relationships between the light source 30 and the light source 30, between the light source 30 and the photoelectric sensor 40, and between the photoelectric sensor 40 and the photoelectric sensor 40 may be adjusted to different degrees, which is not limited in this embodiment.

In some embodiments, the display panel 10 may be a liquid crystal display panel, and its specific structure is shown in FIG. 1. In a direction opposite to the light exit direction of the display panel, a first polarizer 101, a color filter substrate 102, a liquid crystal layer 103, an array substrate 104 and a second polarizer 105 are sequentially provided. The color filter substrate 102 may be formed by combining a color filter and a transparent substrate, but it is not limited thereto, and various color dyes may be combined by resin to achieve the same effect; a TFT circuit is also provided on the array substrate 104 to control the deflection of the liquid crystal layer 103. It should be noted that the specific structure of the display panel 10 shown in FIG. 1 is only an optional structure of the display panel 10, and it may be different in actual application according to the actual structures of various components, which is not limited in this embodiment.

In this embodiment, by arranging the backlight layer 20 and the array of light sources 30 mounted on the backlight layer 20, the texture image of the object to be detected is irradiated, and the light reflected by the object to be detected is acquired and received by the array of the photoelectric sensors 40, then the texture image of the object to be detected can be recognized according to the comparison of the light parameters acquired by the photoelectric sensors 40 and the light emitted by the light sources 30, thereby realizing in-screen acquisition and recognition of the texture such as fingerprint, or palm print.

Figure 2:
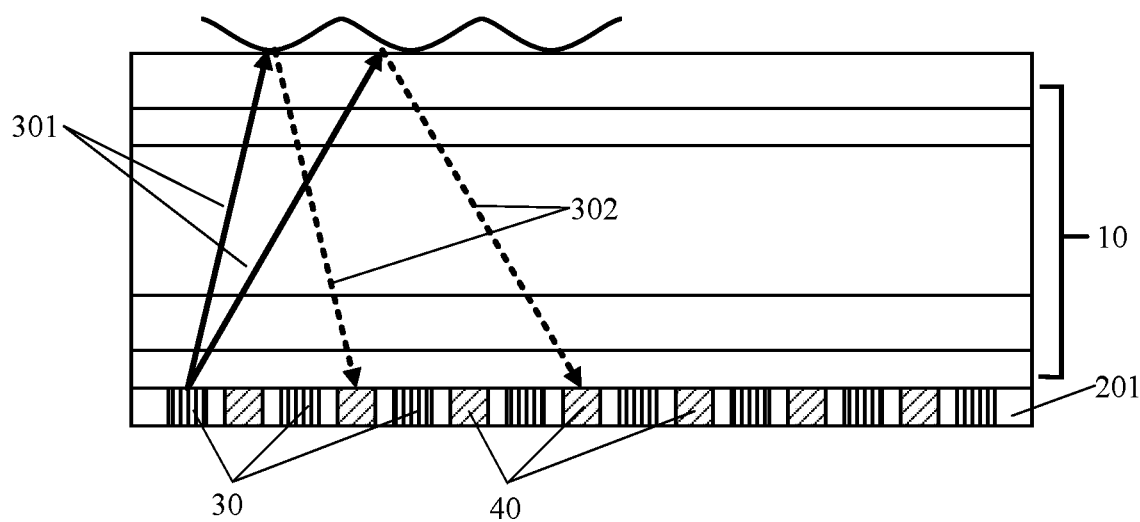
FIG. 2 is a schematic structural view of a texture acquisition device according to an embodiment of the present disclosure.

FIG. 2 is a schematic structural view of a texture acquisition device according to an embodiment of the present disclosure, and the description for a similar structure to that in FIG. 1 is omitted here to avoid redundancy. As shown in FIG. 2, the backlight layer includes a first substrate 201, the light sources 30 and the photoelectric sensors 40 are disposed on the first substrate 201, and the photoelectric sensors 40 are disposed in the gaps between adjacent light sources 30. In this way, the light sources 30 and the photoelectric sensors 40 can be formed in the same layer, for example, the arrangement and formation of the light sources 30 and the photoelectric sensors 40 can be completed in the same processing step by using the same process (for example, "transferring" them to the first substrate 201). In this way, the manufacture is more convenient, the manufacturing cost is lower, and it is easier to assembly with other layers.

In this case, the light sources 30 in the array of light sources 30 are configured to be turned on in a time-sharing manner. Taking a fingerprint as an example, the process of fingerprint acquisition by the texture acquisition device will be described in detail with reference to FIG. 2.

After a user places his finger pulp on the upper surface of the display panel 10, the light sources 30 are turned on in a time-sharing manner, so that there is only one light source 30 at a time to emit light toward the fingerprint of the user's finger (indicated by the wavy line in FIG. 2). Taking the light source 30 on the leftmost side in FIG. 2 as an example, the light emitted is a first light ray 301 (indicated by solid arrows in FIG. 2). When the first light ray 301 reaches the light exit side of the display panel 10, in case where the fingerprint is not placed on the light exit side of the display panel 10 or the position irradiated by the first light ray 301 is the fingerprint valley of the user's fingerprint, the first light ray 301 will be totally reflected, and the reflected second light ray 302 (indicated by dotted arrows in FIG. 2) is received by various photoelectric sensors 40. Since the first light ray 301 is totally reflected, the light intensity of the second light ray 302 and the light intensity of the first light ray 301 should be the same. In case where the irradiated position of the first light ray 301 is the fingerprint ridge of the user's fingerprint, the fingerprint ridge will absorb part of the energy of the first light ray 301, then the light intensity of the second light ray 302 reflected back will be smaller than the light intensity of the first light ray 301. In some embodiments, the photoelectric sensor 40 can output a corresponding current according to the magnitude of the acquired light intensity. According to the magnitudes of the currents output from the photoelectric sensors 40 at different positions, the magnitude of the light intensity of the second light ray 302 that is acquired by the corresponding photoelectric sensor 40 and reflected at different positions can be correspondingly determined, thereby achieving the texture image of the fingerprint at different positions.

Figure 3:
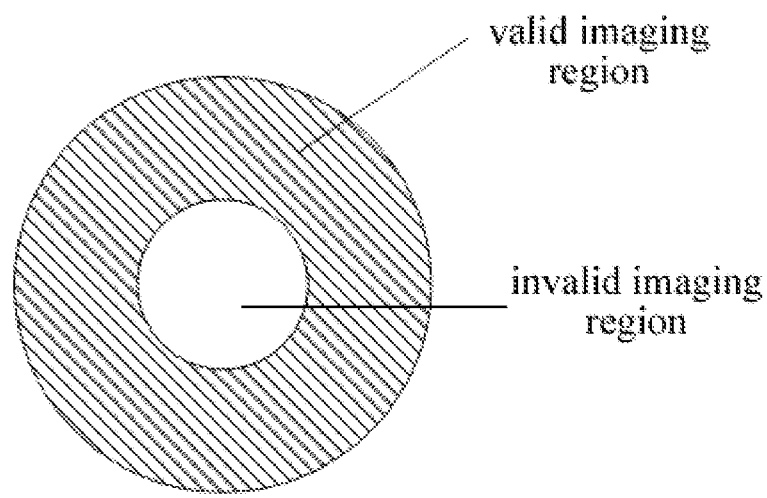
FIG. 3 is a schematic view showing imaging regions of a light source according to an embodiment of the present disclosure.

In case where a single light source 30 is turned on, the first light ray emitted by it forms an annular image as shown in FIG. 3 on the first substrate after reflection, the circular region in the center is an invalid imaging region, the annular region connected to the outside of the circular region is a valid imaging region (shadow part in FIG. 3). Each light source 30 has its corresponding valid imaging region. When actually acquiring the texture image of the fingerprint, only the light received by the photoelectric sensors 40 in the valid imaging regions of various light sources 30 is used, and after all light sources 30 are sequentially turned on, the texture images recognized by the photoelectric sensors 40 for different light sources 30 during the lighting process are integrated to form a complete fingerprint texture image.

When integrating the texture images recognized by the photoelectric sensors 40 for different light sources 30 during the lighting process, it may specifically include the integration of the texture images formed by the same photoelectric sensor 40 at different lighting times and the combination of different texture images formed by different photoelectric sensors 40.

Figure 4:
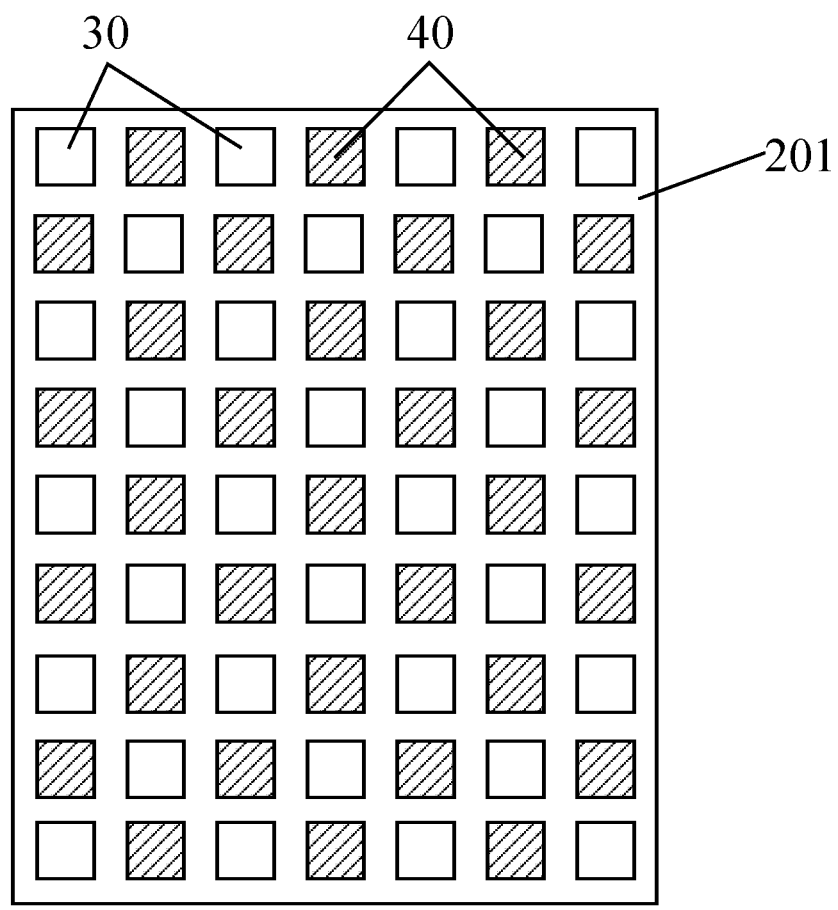
FIG. 4 shows an arrangement of light sources and photoelectric sensors according to an embodiment of the present disclosure.

FIG. 4 shows an alternative arrangement of the light sources 30 and the photoelectric sensors 40 on the first substrate, that is, the light sources 30 and the photoelectric sensors 40 are arranged alternately, the distance between adjacent light sources 30 is constant, and the distance between adjacent photoelectric sensors 40 is constant, the distance between adjacent light source 30 and photoelectric sensor 40 is also constant, and the ratio of the number of the light sources 30 to the number of the photoelectric sensors 40 is 1:1. The white blocks in FIG. 4 represent the light sources 30, and the blocks with shadow represent the photoelectric sensors 40. By arranging the light sources 30 and the photoelectric sensors 40 in the manner shown in FIG. 4, when the light sources 30 are turned on in a time-sharing manner, the second light ray reflected back by the object to be detected is more uniformly received by the photoelectric sensors 40 to ensure good reception efficiency. In some embodiments, the gaps between adjacent light sources 30 are between 1300 micrometers and 1500 micrometers. The gaps can be optionally set to 1340 micrometers, in this case, the maximum size of the photoelectric sensors 40 disposed at the gaps between the light sources 30 does not exceed 127 micrometers. In actual application, the gaps between the light sources 30 and the size of the photoelectric sensors 40 can be accordingly adjusted within an appropriate range, according to the size of the display panel 10 and the matching degree of the type and model of various devices. FIG. 1, FIG. 2 and FIG. 4 are only schematic views showing the positional relationship between the light sources 30 and the photoelectric sensors 40, and it does not limit the size of them in actual application.

Figure 5:
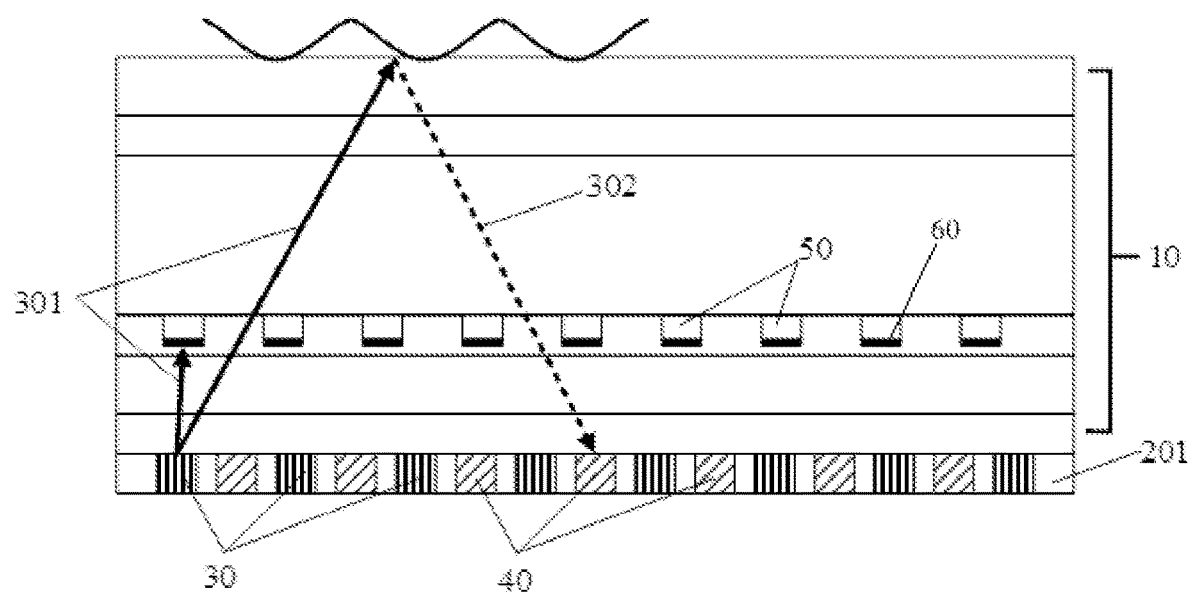
FIG. 5 shows an arrangement of a black matrix according to an embodiment of the present disclosure.

Since the array substrate 104 includes a TFT circuit, the TFT circuit may reflect the light emitted from the light source 30 in actual application due to its opaque material. The light reflected by the TFT is received by the photoelectric sensors 40, and then it will interfere the acquisition of the texture of the object to be detected, affecting the accuracy of its acquisition. In order to solve the above problem, in some embodiments, a black matrix (BM) may be provided on a side of the TFT circuit away from the light exit side to achieve absorption of light irradiated onto the TFT circuit. As shown in FIG. 5, a thin film transistor layer is provided on the array substrate 104, thin film transistors (TFTs) 50 are arranged thereon at intervals, and the black matrix 60 (indicated by solid black parts in FIG. 5) with a certain thickness is provided below the TFTs 50. The first light ray 301 irradiated on the TFTs 50 is absorbed by the black matrix 60, and therefore the second light ray 302 will not be generated, which prevents the light reflected by the TFTs from affecting the accuracy of the texture image acquisition of the object to be detected. Meanwhile, the first light ray 301 irradiated on the fingerprint to be recognized through the gaps between the TFTs 50 is reflected to form the second light ray 302, and then is acquired by the photoelectric sensors 40 to realize the recognition of the texture image of the object to be detected.

FIG. 6 is a schematic structural view of a texture acquisition device according to an embodiment of the present disclosure, and the description for a similar structure to that in FIG. 2 is omitted here to avoid redundancy. As shown in FIG. 6, the backlight layer includes a first substrate 201, the light sources 30 are disposed on the first substrate 201, there is a gap between any two adjacent light sources 30, and through holes 202 are provided in the first substrate 201 at positions corresponding to the gaps. Here, the array of photoelectric sensors 40 is disposed on a side of the first substrate 201 away from the display panel 10, so that the light reflected by the object to be detected passes through the various through holes to reach a corresponding group of photoelectric sensors 40 (FIG. 6 only shows a group of photoelectric sensors 40 as a schematic). In this case, the light sources 30 in the array of light sources 30 are configured to be turned on at the same time. In this way, the light sources 30 and the photoelectric sensors 40 are arranged in different layers, and the pinhole imaging principle is used to realize the acquisition of the texture of the object to be detected, which can simplify the integration process of the texture image, and if there is a failure during subsequent use, different layers may be separately maintained or replaced, therefore it is more convenient to use.

Taking a fingerprint as an example, the process of fingerprint acquisition by the texture acquisition device will be described in detail with reference to FIG. 6.

After a user places his finger pulp on the upper surface of the display panel 10, the light sources 30 are turned on at the same time. After the first light ray 301 emitted by the light sources is reflected by the texture of the object to be detected, the second light ray 302 reflected back passes through the through holes 202 between the light sources 30, and then is acquired by a group of photoelectric sensors 40 corresponding to the through holes 202. According to the pinhole imaging principle, each group of photoelectric sensors 40 receives the second light ray 302 passing through the through holes, and a reduced image of the texture is formed. By combining the reduced images formed by the groups of photoelectric sensors 40, a texture image of the object to be detected can be obtained. In some embodiments, the size of the through holes 202 may be set between 10 and 20 micrometers. Optionally it is between 15 and 17 micrometers, to ensure the best pinhole imaging effect. In this case, in the group of photoelectric sensors provided at positions corresponding to the through holes 202, the size of each photoelectric sensor 40 does not exceed 35 micrometers.

The specific number of photoelectric sensors 40 in each group of photoelectric sensors may be determined in actual application based on the size of the display panel 10, the vertical distance between the photoelectric sensor 40 and the through hole 202.

It should be noted that the display panel 10 in this embodiment may be a liquid crystal display panel, and at least one of palm print, fingerprint, iris print, and vein print may be acquired by the texture acquisition device according to this embodiment. FIG. 7 is a flowchart of a method for manufacturing a texture acquisition device according to an embodiment of the present disclosure, and the method mainly includes steps S71 and S72:

S71: forming a backlight layer on a side of the display panel away from a light exit side of the display panel, the backlight layer including an array of light sources, the light sources being configured to irradiate an object to be detected on the light exit side of the display panel, a gap being between adjacent light sources;

S72: forming an array of photoelectric sensors to detect the light reflected by the object to be detected.

In some embodiments, the array of photoelectric sensors may be formed in the step S72 in various ways. For example, the photoelectric sensors may be provided in the gaps. As another example, an array of photoelectric sensors may be provided on the side of the backlight layer away from the display panel and through holes may be provided at the gaps, so that the light reflected by the object to be detected passes through the through holes to reach a corresponding group of photoelectric sensors. These are merely examples but not limiting, in fact, it is feasible as long as one or more of the photoelectric sensors are correspondingly arranged on optical paths in which the light is reflected by the object to be detected and irradiated to various gaps, thereby the photoelectric sensors detect the light reflected by the object to be detected, i.e., recognizing the texture image of the object to be detected.

In some embodiments, the formation of the array of light sources and the array of photoelectric sensors are implemented by using transfer technology to reduce the thickness of the backlight layer as much as possible and reduce the volume of the texture acquisition device. In some embodiments, the step of forming an array of photoelectric sensors may include providing photoelectric sensors in gaps between the light sources. By turning on the light sources in a time-sharing manner, the light reflected by the object to be detected is detected by various photoelectric sensors to recognize the texture image of the object to be detected, and finally, texture images recognized by the various photoelectric sensors for turning-on of each light source are integrated, to recognize the texture image of the object to be detected. Specifically, in the case where the photoelectric sensors are provided in the gaps, firstly, a first substrate is formed on the side of the display panel away from the light exit side, and light sources are provided on the first substrate by a transfer technique in such a way that there are gaps between adjacent light sources. The size of the gaps may be set between 1300 micrometers and 1500 micrometers, optionally set to 1340 micrometers, and then the photoelectric sensors are provided in the gaps, the maximum size of the photoelectric sensors does not exceed 127 micrometers. Optionally, the light sources may be mini LEDs or micro LEDs, and the distance between adjacent photoelectric sensors must be the same when transferring, the distance between adjacent light sources is the same, the number ratio of the photoelectric sensor to the light source is 1:1.

In addition, the display panel in this embodiment may be a liquid crystal display panel, and its manufacturing method is the same as that in the related art, and therefore it will not be described in detail here. It should be understood that, when manufacturing the TFT circuit in the display panel, a black matrix with a certain thickness may be provided below the TFT circuit to prevent the light emitted from the light sources from being reflected by the TFT circuit and received by the photoelectric sensors, thereby prevent the affection on the acquisition and recognition of the texture of the object to be detected.

In some embodiments, the step of forming an array of photoelectric sensors may further include providing the array of photoelectric sensors on the side of the backlight layer away from the display panel and providing through holes at the gaps, so that the light reflected by the object to be detected passes through the through holes to reach a corresponding group of photoelectric sensors. Specifically, firstly, a first substrate is formed on the side of the display panel away from the light exit side, light sources are provided on the first substrate by a transfer technique in such a way that there are gaps between adjacent light sources. The size of the gaps may be set between 1300 micrometers and 1500 micrometers, optionally set to 1340 micrometers. Then, through holes with a width of 10 to 20 micrometers are provided at the gaps, the width is optionally 15 to 17 micrometers, and then the groups of photoelectric sensors are provided on the side of the first substrate away from the display panel, so that the light reflected by the object to be detected passes through the through holes to reach a corresponding group of photoelectric sensors.

Figure 8:
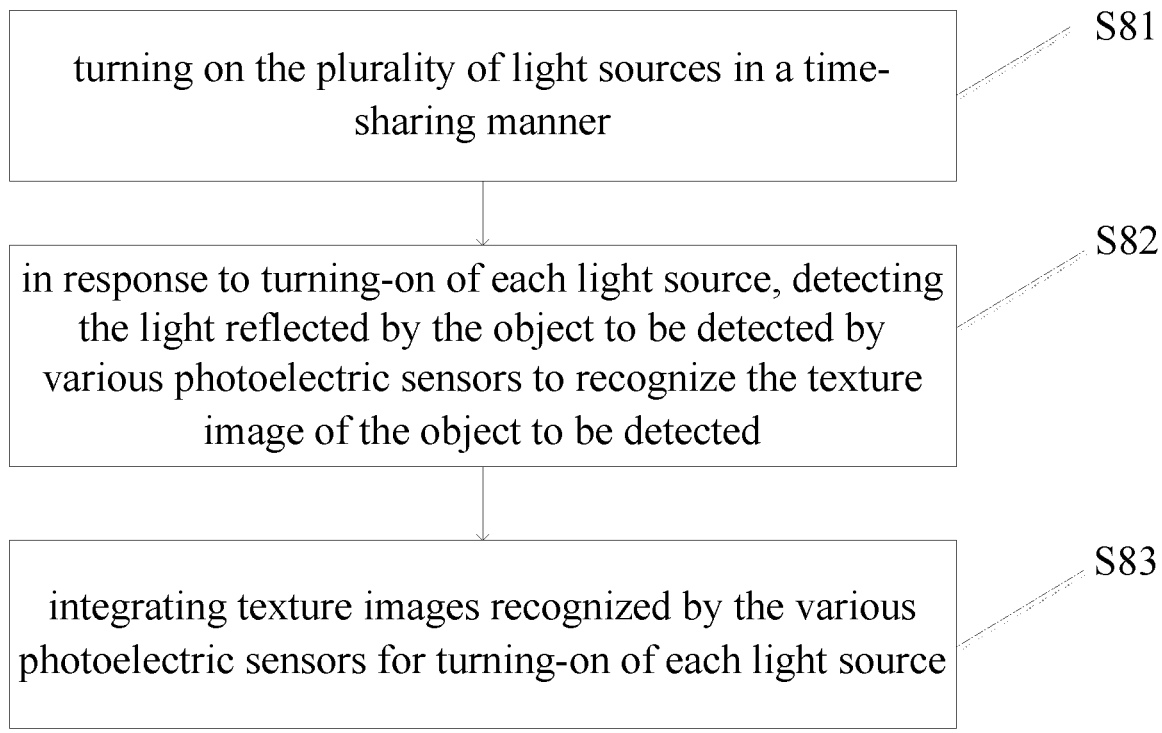
FIG. 8 is a flowchart of a texture acquisition method according to an embodiment of the present disclosure.

FIG. 8 is a flowchart of a method for implementing texture acquisition using the above texture acquisition device according to the embodiments of the present disclosure, and the method mainly includes steps S81 to S83:

S81: turning on the plurality of light sources in a time-sharing manner;

S82: in response to turning-on of each light source, detecting the light reflected by the object to be detected by various photoelectric sensors to recognize the texture image of the object to be detected; and S83: integrating texture images recognized by the various photoelectric sensors for turning-on of each light source.

Specifically, in this embodiment, the step of integrating texture images recognized by the various photoelectric sensors for turning-on of each light source mainly includes: integrating the texture images formed by the same photoelectric sensor at different lighting times to form a clear and complete texture image of the object to be detected.

Figure 9:
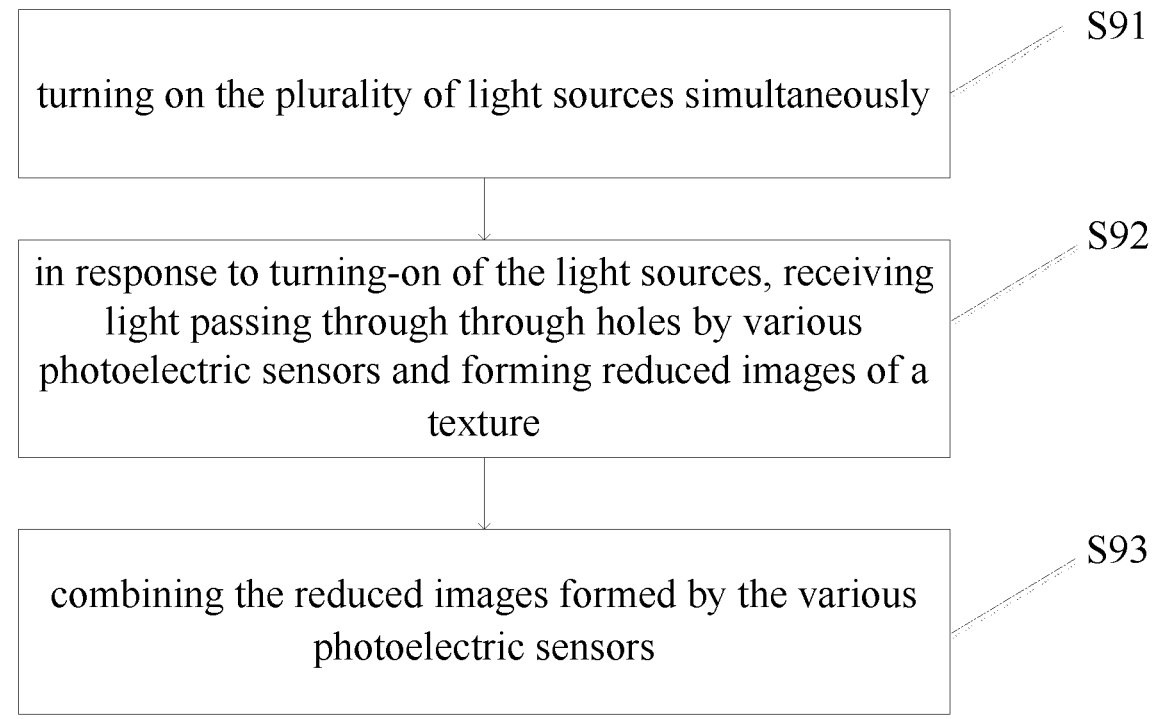
FIG. 9 is a flowchart of a texture acquisition method according to an embodiment of the present disclosure.

FIG. 9 is a flowchart of another method for implementing texture acquisition using the above texture acquisition device according to the embodiments of the present disclosure, and the method mainly includes steps S91 to S93:

S91: turning on the plurality of light sources simultaneously;

S92: in response to turning-on of the light sources, receiving light passing through through holes by various photoelectric sensors and forming reduced images of a texture; and S93: combining the reduced images formed by the various photoelectric sensors.

Specifically, in this embodiment, the combining the reduced images formed by the various photoelectric sensors mainly includes: combining the texture images formed by different photoelectric sensors, and finally, adjusting the direction of the combined image to form a complete upright texture image of the object to be detected.

In this embodiment, by providing an array of light sources that illuminate the object to be detected and an array of photoelectric sensors that acquire light, the light reflected by the object to be detected can be acquired as a basis for recognizing the texture image of the object to be detected after a convenient and low-cost modification that is compatible with various display panels including a liquid crystal display panel is implemented, thereby realizing in-screen acquisition and recognition of the texture such as fingerprint, or palm print.

The above embodiments are only exemplary embodiments of the present disclosure, but are not used to limit the present disclosure. The scope of the present disclosure is defined by the claims. Various modifications or equivalent replacements may be made to the present disclosure by those skilled in the art within the spirit and scope of the present disclosure, and such modifications or equivalent replacements shall also fall within the scope of the disclosure.

What is claimed is:

1. A texture acquisition method of a texture acquisition device, comprising:
    turning on a plurality of light sources in a time-sharing manner;
    in response to turning-on of each light source, detecting light reflected by an object to be detected by various photoelectric sensors to recognize a texture image of the object to be detected; and
    integrating texture images recognized by the various photoelectric sensors for turning-on of each light source,
    wherein the texture acquisition device comprises:
    a display panel;
    a backlight layer comprising the plurality of light sources spaced apart from each other, the light sources being configured to emit the light toward a light exit side of the display panel; and
    a plurality of photoelectric sensors,
    wherein the texture acquisition device is configured in such a way that the light emitted by the light sources is irradiated to a region between adjacent light sources of the plurality of light sources after being reflected by the object to be detected on the display panel, to form an optical path, and at least one photoelectric sensor of the plurality of photoelectric sensors is provided in the optical path so as to detect the light reflected by the object to be detected to recognize the texture image of the object to be detected,
    wherein the display panel is a liquid crystal display panel,
    wherein the plurality of light sources spaced apart from each other constitute a light source array, and the plurality of photoelectric sensors constitute a photoelectric sensor array, and
    wherein, the photoelectric sensors, other than ones located at outermost periphery, are disposed between adjacent light sources.

2. The texture acquisition device according to claim 1, wherein the backlight layer comprises a substrate, and the photoelectric sensors and the light sources are disposed on or in the substrate.

3. The texture acquisition device according to claim 1, wherein the light sources are mini light emitting diodes or micro light emitting diodes.

4. The texture acquisition device according to claim 1, wherein a distance between any two adjacent photoelectric sensors is constant, a distance between any two adjacent light sources is constant, and a number ratio of the photoelectric sensors to the light sources is 1:1.

5. The texture acquisition device according to claim 1, wherein the display panel comprises, in order from the light exit side of the display panel to the backlight layer:
    a first polarizer;
    a color filter substrate;
    a liquid crystal layer;
    an array substrate; and
    a second polarizer.

6. The texture acquisition device according to claim 1, wherein a TFT circuit is provided on the array substrate for controlling deflection of the liquid crystal layer, and a black matrix is provided on a side of the TFT circuit facing the backlight layer for absorbing light irradiated to the TFT circuit.

7. A texture acquisition method of a texture acquisition device, comprising:
    turning on a plurality of light sources simultaneously;
    in response to turning-on of the light sources, receiving light passing through through holes by various photoelectric sensors and forming reduced images of a texture; and
    combining the reduced images formed by the various photoelectric sensors
    wherein the texture acquisition device comprises:
    a display panel;
    a backlight layer comprising the plurality of light sources spaced apart from each other, the light sources being configured to emit light toward a light exit side of the display panel; and
    a plurality of photoelectric sensors,
    wherein the texture acquisition device is configured in such a way that the light emitted by the light sources is irradiated to a region between adjacent light sources of the plurality of light sources after being reflected by an object to be detected on the display panel, to form an optical path, and at least one photoelectric sensor of the plurality of photoelectric sensors is provided in the optical path so as to detect the light reflected by the object to be detected to recognize an texture image of the object to be detected,
    wherein the display panel is a liquid crystal display panel,
    wherein the plurality of light sources spaced apart from each other constitute a light source array, and the plurality of photoelectric sensors constitute a photoelectric sensor array, and wherein the region between the adjacent light sources is provided with a through hole, and the photoelectric sensor array is disposed on a side of the backlight layer away from the display panel, so that the light reflected by the object to be detected passes through the through hole to reach a group of the photoelectric sensors.

8. The texture acquisition device according to claim 7, wherein the backlight layer comprises a substrate, the light sources are disposed on or in the substrate, and the region between the adjacent light sources on the substrate is provided with the through hole.

* * * * *